(12) United States Patent
Kuroda et al.

(10) Patent No.: US 12,508,326 B2
(45) Date of Patent: Dec. 30, 2025

(54) NUCLEIC ACID CARRIER AND METHOD FOR ADMINISTERING NUCLEIC ACID

(71) Applicant: TOKYO MEDICAL UNIVERSITY, Tokyo (JP)

(72) Inventors: Masahiko Kuroda, Tokyo (JP); Masakatsu Takanashi, Tokyo (JP); Shin-ichiro Ohno, Tokyo (JP); Tomohiro Umezu, Tokyo (JP)

(73) Assignee: TOKYO MEDICAL UNIVERSITY, Tokyo (JP)

( * ) Notice: Subject to any disclaimer, the term of this patent is extended or adjusted under 35 U.S.C. 154(b) by 823 days.

(21) Appl. No.: 17/597,366

(22) PCT Filed: Jul. 3, 2020

(86) PCT No.: PCT/JP2020/026280
§ 371 (c)(1),
(2) Date: Jan. 4, 2022

(87) PCT Pub. No.: WO2021/006222
PCT Pub. Date: Jan. 14, 2021

(65) Prior Publication Data
US 2022/0233717 A1   Jul. 28, 2022

(30) Foreign Application Priority Data
Jul. 5, 2019   (JP) .................................. 2019-126172

(51) Int. Cl.
*A61K 48/00*   (2006.01)
*A61K 47/69*   (2017.01)
*C12N 15/113*   (2010.01)
*C12N 15/88*   (2006.01)

(52) U.S. Cl.
CPC ...... *A61K 48/0033* (2013.01); *A61K 47/6911* (2017.08); *C12N 15/113* (2013.01); *C12N 15/88* (2013.01); *C12N 2310/141* (2013.01); *C12N 2310/3515* (2013.01); *C12N 2320/32* (2013.01)

(58) Field of Classification Search
CPC ............................ A61K 31/7105; A61K 47/46
See application file for complete search history.

(56) References Cited

U.S. PATENT DOCUMENTS

| 2014/0308212 | A1 | 10/2014 | Zhang |
| 2017/0037398 | A1 | 2/2017 | Kuroda et al. |
| 2018/0362974 | A1* | 12/2018 | Zhang .................... C12N 15/111 |
| 2022/0233717 | A1 | 7/2022 | Kuroda et al. |

FOREIGN PATENT DOCUMENTS

| CN | 107920995 | 4/2018 |
| WO | 2015/099122 | 7/2015 |
| WO | 2017/004526 | 1/2017 |
| WO | 2020214542 A1 | 10/2020 |
| WO | 2021006222 A1 | 1/2021 |

OTHER PUBLICATIONS

Wang, Q. et al., Delivery of therapeutic agents by nanoparticles made of grapefruit-derived lipids, Sep. 6, 2013, Nature Communications, vol. 6, 1867, 1-11 (Year: 2013).*
Li, Z et al., Arrowtail RNA for ligand display on ginger exosome-like nanovesicles to systemic deliver siRNA for cancer suppression, Oct. 2, 2018, Scientific Reports, vol. 8, 14644 (Year: 2018).*
Prakash, A. et al., Acerola, an untapped functional superfruit: a review on latest frontiers, Jul. 11, 2018, Journal of Food Science and Technology, vol. 55, 3373-3384 (Year: 2018).*
Bowen, "Particle Size Distribution Measurement from Millimeters to Nanometers and from Rods to Platelets", Journal of Dispersion Science and Technology, vol. 23, No. 5, pp. 631-662, 2002.
Extended European Search Report issued in European Patent Application No. 20836641.9, Apr. 14, 2023, 9 pages.
International Search Report issued in International Application No. PCT/JP2020/026280, Aug. 18, 2020, 7 pages w/translation.
Wang, et al., "Delivery of therapeutic agents by nanoparticles made of grapefruit-derived lipids", Nature Communications, 2013, vol. 4:1867, pp. 1-11.
Takanashi, et al., "Current Situation and Development of Nucleic Acid Drugs Targeting Disease Therapy Using Exosomes", The Medical Frontline, 2018, vol. 73, No. 9, pp. 1237-1242—cited in the ISR and its English translation listed above.
Zhefeng, et al., "Arrowtail RNA for Ligand Display on Ginger Exosome-like Nanovesicles to Systemic Deliver siRNA for Cancer Suppression",Scientific Reports, 2018, 8(1):14644, pp. 1-11.
International Search Report (with English translation) and Written Opinion issued in CT/JP2023/035106, mailed Dec. 12, 2023.
Umezu et al.,"Acerola exosome-like nanovesicles to systemically deliver nucleic acid medicine via oral administration", Molecular therapy—methods & clinical development, Jun. 2021 Nature Publishing Group, GB—ISSN 2329-0501, vol. 21, pp. 199-208.
Garaeva et al., "Delivery of functional exogenous proteins by plant-derived vesicles to human cells in vitro", Scientific Reports, Jan. 1, 2021, Nature Publishing Group, US—ISSN 2045-2322, vol. 1, No. 1.
Shkryl et al., "Plant Exosomal Vesicles: Perspective Information Nanocarriers in Biomedicine", Applied Sciences, Aug. 18, 2022 MDPI Switzerland—ISSN 2076-3417, vol. 12, No. 16, pp. 8262.

* cited by examiner

*Primary Examiner* — Trevor Love
*Assistant Examiner* — Paul Hoerner
(74) *Attorney, Agent, or Firm* — HSML P.C.

(57) ABSTRACT

Provided is a novel carrier for introducing a nucleic acid such as a siRNA into a cell. The carrier for a nucleic acid of the present invention includes vesicles from a plant in the family Malpighiaceae, and preferably vesicles derived from acerola. A method for administering a nucleic acid according to the present invention includes forming a conjugate of the carrier for a nucleic acid of the present invention and a nucleic acid and administering the conjugate.

4 Claims, 9 Drawing Sheets

A : Vesicle only

B : Vesicle + Labeled miR-340 mimic

C : Labeled miR-340 mimic

NUCLEIC ACID CARRIER AND METHOD FOR ADMINISTERING NUCLEIC ACID

TECHNICAL FIELD

The present invention relates to a carrier for a nucleic acid and a method for administering a nucleic acid.

BACKGROUND ART

Attempts have recently been made to apply nucleic acid reagents such as siRNAs, short hairpin RNAs (shRNAs), and microRNAs (miRNAs) that suppress gene expression to the field of medicine. However, drug delivery systems (DDSs) for enabling uptake of the nucleic acid reagents into cells are still under development, and a carrier capable of holding a nucleic acid and reproducibly allowing uptake of the nucleic acid into cells has not yet been established.

SUMMARY OF INVENTION

Technical Problem

Therefore, an object of the present invention is to provide a novel carrier for introducing a nucleic acid such as a siRNA into a cell.

Solution to Problem

In order to achieve the above object, a carrier for a nucleic acid of the present invention includes vesicles from a plant fruit.

A delivery-type nucleic acid reagent of the present invention includes the carrier for a nucleic acid of the present invention and a nucleic acid, wherein the carrier for a nucleic acid and the nucleic acid form a conjugate.

A method for producing a delivery-type nucleic acid reagent according to the present invention includes allowing the carrier for a nucleic acid of the present invention and a nucleic acid to coexist in a solvent to thereby form a conjugate of the carrier for a nucleic acid and the nucleic acid.

A method for administering a nucleic acid according to the present invention includes forming a conjugate of the carrier for a nucleic acid of the present invention and a nucleic acid and administering the conjugate.

Advantageous Effects of Invention

For example, the carrier for a nucleic acid of the present invention can easily hold a nucleic acid, and furthermore, can introduce the thus held nucleic acid into cells. Therefore, it can be said that the present invention is very useful as a DDS in, for example, the field of medicine such as gene therapy.

DESCRIPTION OF EMBODIMENTS

Figure 1:
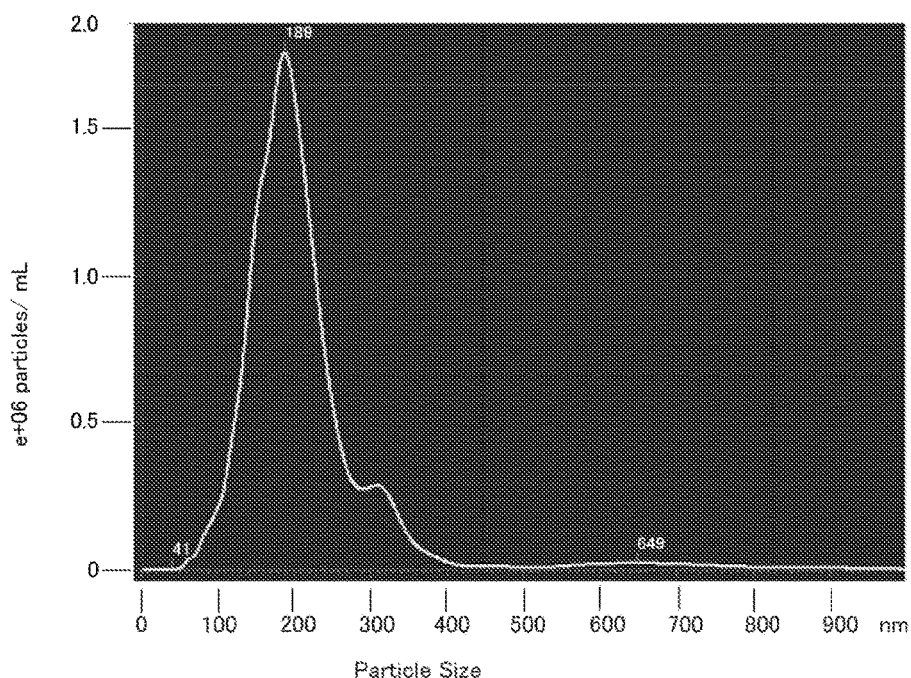
FIG. 1 is a graph showing a particle size distribution of vesicles derived from acerola of Example 1.

Unless otherwise specified, the terms used herein may be understood in the sense commonly used in the art.

(1) Nucleic Acid Carrier

As described above, a carrier for a nucleic acid (hereinafter also referred to as a "nucleic acid carrier") of the present invention includes vesicles from a plant fruit. The inventors of the present invention found that vesicles from a plant fruit hold a nucleic acid, a conjugate (hereinafter also referred to as a "complex") of the nucleic acid and the vesicles is taken up into cells, and the thus held nucleic acid is functional in the cells, and thus established the present invention. The feature of the present invention is that the nucleic acid carrier includes the vesicles, and there are no particular limitations on the other configurations and conditions.

There is no particular limitation on the plant from which the plant fruit is derived, and a plant in the family Malpighiaceae, a plant in the family Rutaceae, and the like can be used.

There is no particular limitation on the type of the plant in the family Malpighiaceae, and examples thereof include plants of the genus *Malpighia*, more specifically, for example, acerola species (*Malpighia* sp.) and the like, and preferably acerolas such as *M. emarginata* DC., *M. glabra*, and *M. punicifolia*.

There is no particular limitation on the plant in the family Rutaceae, and examples thereof include plants of the genus *Citrus*, more specifically, for example, grapefruit species (*Citrus×paradisi*, English name: grapefruit), lemon species (*C. limon*, English name: lemon), and the like.

The vesicles can be obtained from the fruit of any of the above-described plants. The fruit may be fully ripe or unripe (not yet be fully ripe), or may be a mixture thereof, for example. It is preferable that the vesicles are, for example, in the form of a vesicular fraction that is collected from the juice of the fruit and that will be described later.

The vesicles can be prepared by, for example, extraction from the above-described plant fruit. There is no particular limitation on the preparation method, and, for example, the vesicles can be obtained by crushing the fruit, preparing a crushed product or a suspension of the crushed product, and fractionating the vesicles using an ultrafiltration method, an ultracentrifugation method, a concentration gradient method, a separation method using a micro liquid system, or other methods. The preparation method may be performed using, for example, a commercially available kit, and ExoEasy Maxi Kit (trade name, available from QIAGEN), ExoQuick (trade name, available from System Bioscience), a Total Exosome Isolation reagent (trade name, available from Invitrogen), and the like can be used. The vesicles may also be prepared by, for example, obtaining a juice by squeezing the fruit, and subjecting the thus obtained juice to any of various separation methods such as those described above. The juice may be, for example, any of a juice obtained from a fully ripe fruit, a juice obtained from an unripe fruit, and a juice obtained from a frozen fruit that may be fully ripe or unripe.

For example, a vesicular fraction containing a plurality of vesicles can be used in the nucleic acid carrier of the present invention. There is no particular limitation on the size of the vesicles, and the vesicles can have a particle size of, for example, 30 to 400 nm, 80 to 300 nm, 150 to 300 nm, 100 to 200 nm, or 80 to 200 nm. The vesicles may also be referred to as microvesicles or nanovesicles, for example. The vesicular fraction containing the plurality of vesicles has a peak particle size of, for example, 30 to 400 nm, 80 to 300 nm, 150 to 300 nm, 100 to 200 nm, or 80 to 200 nm when expressed using a particle size distribution. Moreover, in the particle size distribution, when the total of the vesicles is taken as 100%, the lower limit of the percentage of vesicles at the above-described peak (e.g., 200±20 nm) is, for example, 30% or more, 50% or more, or 80% or more, and the upper limit is, for example, 100%, 80% or less, or 70% or less. The vesicular fraction is, for example, a fraction extracted from a juice of the fruit so as to have the above-described particle size and particle size distribution. In the case where the vesicular fraction is used in the nucleic acid carrier of the present invention, for example, a fraction can be used that has been extracted from the plant fruit using an extraction method that achieves the above-described particle size and particle size distribution, and this fraction may contain another component derived from the juice.

There is no particular limitation on the method for measuring the particle size of the vesicles; for example, nanoparticle tracking analysis and other methods can be adopted, and, for example, commercially available equipment (device names: NanoSight and qNANO) and the like can be used. The vesicles may be either extracellular vesicles or intracellular vesicles, for example. The vesicles may be, for example, exosome-like vesicles (being equal in size to human-derived exosomes). Vesicles that are equal in size to human-derived exosomes may be, for example, vesicles obtained using an isolation method similar to that of human-derived exosomes.

The nucleic acid carrier of the present invention can form a conjugate with a nucleic acid. Specifically, the vesicles can form a conjugate with the nucleic acid. The conjugate formation between the nucleic acid and the nucleic acid carrier enables the delivery of the nucleic acid, and therefore, the conjugate will hereinafter also be referred to as a "delivery-type nucleic acid reagent". There is no particular limitation on the form of the conjugate, and, for example, the conjugate may have a form in which the nucleic acid is encapsulated in the vesicles or a form in which the nucleic acid is supported by an outer wall of the vesicles. There is no particular limitation on the method for forming a conjugate of the vesicles and the nucleic acid, and, for example, it may be sufficient that the vesicles and the nucleic acid are simply allowed to coexist in a solvent, or a common method for introducing a nucleic acid into cells may be used. In the former case, a conjugate of the vesicles and the nucleic acid can be formed by, for example, allowing the vesicles and the nucleic acid to coexist in a solvent and incubating them. There is no particular limitation on the incubation temperature, and, for example, the incubation temperature may be either within a room temperature range (e.g., 30±10° C.) or a temperature range (e.g., above 0° C. and below 20° C.) lower than the room temperature range. Preferably, the incubation temperature is within a low temperature range (e.g., 4±5° C.), and more preferably under ice cooling conditions (e.g., 1° C. to 6° C.), because, when RNase is mixed, degradation of the nucleic acid before the conjugate formation can be prevented. There is no particular limitation on the incubation time; the lower limit is, for example, 5 minutes or longer, or 15 minutes or longer, and the upper limit is not particularly limited. For example, a plateau in conjugate formation can be reached through incubation for about 30 minutes. There is no particular limitation on the solvent, and, for example, liquids such as water, saline, a buffer solution such as PBS, and the like can be used. In the latter case, for example, electroporation, lipofection, and other methods can be used.

Heretofore, for example, a method in which a nucleic acid is introduced (encapsuled) into a carrier through electroporation or the like has been reported as a DDS for a nucleic acid. However, an effective means has not yet been made clear in terms of reproducibility and the like. Moreover, for this reason, for example, in a method that uses animal-derived exosomes for a DDS, a technique of modifying exosome-producing cells themselves has been adopted. In contrast, with the nucleic acid carrier of the present invention, since the vesicles from the plant fruit can form a conjugate with the nucleic acid by, for example, simply being allowed to coexist with the nucleic acid in the solvent as described above, the nucleic acid, which is a target to be delivered by a DDS, can be held very easily by the vesicles. Furthermore, with the nucleic acid carrier of the present invention, for example, due to the conjugate formation between the nucleic acid carrier and the vesicles, the nucleic acid can also be introduced into cells from outside the cells by endocytosis of the vesicles.

As described above, the conjugate can be formed by, for example, simply allowing the nucleic acid and the vesicles to coexist in the solvent, and therefore, in order for the nucleic acid to be supported by the vesicles, a conventional transfection method or the like can be omitted. Examples of the transfection method include a heat shock method in which calcium chloride is added. The heat shock method is a method for performing heat treatment by, for example, changing the temperature in the coexistence of a carrier (e.g., cells) for supporting a nucleic acid and the nucleic acid, performing incubation for a predetermined period of time, and then returning the temperature to the original temperature. The change in temperature is, for example, from a relatively low temperature (treatment temperature before the change) to a relatively high temperature (treatment temperature after the change), and it is preferable that, after the incubation at the relatively high temperature, the temperature is returned to the relatively low temperature. The amount of change in temperature (temperature difference before and after the change) is, for example, 5° C. to 45° C., the treatment temperature before the change is, for example, a low temperature, specifically 1° C. to 10° C., and the treatment temperature after the change is, for example, a high temperature, specifically 40° C. to 46° C.

Moreover, the nucleic acid carrier of the present invention can prevent degradation of a nucleic acid by RNase, acid, alkali, and the like by, for example, forming a conjugate with the nucleic acid. For this reason, the nucleic acid carrier of the present invention can be said to be a nucleic acid degradation inhibitor.

The nucleic acid is, for example, a nucleic acid reagent for suppressing expression. There is no particular limitation on the mechanism by which the nucleic acid reagent suppresses expression, and, for example, the mechanism may be suppression of gene expression or suppression of protein expression and specifically includes inhibition of transcription from genes, inhibition of translation into proteins, degradation of transcripts, and the like. There is no limitation on the type of the nucleic acid reagent, and examples thereof include siRNA, antisense, shRNA, miRNA, miRNA mimics (see WO 2015/099122 for example), and the like.

In the conjugate formation, there is no particular limitation on the ratio of the amount of the vesicles added to the amount of the nucleic acid, and, for example, with respect to 1 pmol of the nucleic acid, the vesicles are added in an amount of $5\times10^4$ to $8\times10^4$ particles, $2\times10^5$ to $5\times10^5$ particles, or $2\times10^6$ to $5\times10^6$ particles.

There is no particular limitation on the site to which the nucleic acid carrier of the present invention can deliver the nucleic acid, and examples thereof include the liver, the intestines (rectum, intestinal tract, stomach, etc.), the brain, the spleen, and the like.

The nucleic acid carrier of the present invention is useful as, for example, pharmaceuticals, diagnostics, and agrochemicals, as well as research tools for agriculture, medicine, life science, and the like.

(2) Delivery-Type Nucleic Acid Reagent and Method for Producing the Same of the Present Invention As described above, the delivery-type nucleic acid reagent (hereinafter also referred to as a "drug" or "medicine") of the present invention includes the nucleic acid carrier of the present invention and the nucleic acid, wherein the nucleic acid carrier and the nucleic acid form a conjugate. Specifically, the vesicles of the nucleic acid carrier of the present invention and the nucleic acid form a conjugate. The descriptions in the section (1) above can be applied to the delivery-type nucleic acid reagent (the conjugate) of the present invention.

As described above, the method for producing a delivery-type nucleic acid reagent according to the present invention includes allowing the nucleic acid carrier of the present invention and the nucleic acid to coexist in the solvent to thereby form a conjugate of the nucleic acid carrier and the nucleic acid. The descriptions in the section (1) above can be applied to the production method of the present invention.

(3) Method for Administering Nucleic Acid

As described above, the method for administering a nucleic acid according to the present invention includes forming a conjugate of the nucleic acid carrier of the present invention and a nucleic acid and administering the conjugate. The feature of the present invention is the use of the nucleic acid carrier of the present invention, and there are no particular limitations on the other steps, conditions, and the like.

There is no particular limitation on the method for forming the conjugate, and, for example, as described above, it may be sufficient that the vesicles and the nucleic acid are simply allowed to coexist, or an electroporation method or the like may be used. In the present invention, for example, the former method is preferable because a conjugate can be easily formed.

In forming a conjugate, there is no particular limitation on the ratio between the vesicles and the nucleic acid, and, for example, the amount of the nucleic acid is 50 to 100 pmol per $2\times10^8$ vesicles.

There is no particular limitation on the form of administration, and, for example, the administration may be in vivo administration or in vitro administration. In the case where the administration is in vitro administration, the target of the administration may be, for example, cells, tissues, organs, or the like. In the case where the administration is in vivo administration, there is no particular limitation on the route of administration, and examples thereof include oral administration and parenteral administration. Examples of the parenteral administration include intravenous administration, intra-arterial administration, intramuscular administration, subcutaneous administration, intraperitoneal administration, topical administration, and the like.

The target of the administration may be, for example, a human or a non-human animal. There is no particular limitation on the non-human animal, and examples thereof include mice, rats, rabbits, dogs, camels, cows, and the like.

Hereinafter, the present invention will be described in greater detail using examples and the like. However, the present invention is not limited to the examples and the like below.

EXAMPLES

Example 1

The function of acerola-derived vesicles as a nucleic acid carrier was confirmed. Kits, reagents, apparatuses, and the like were used according to their instruction manuals. Unless otherwise specified, the conditions for each process were the same in the following examples.

(1) Preparation of Vesicles

First, 8 mL of the juice of fully ripe acerola fruit from Okinawa was filtered using a membrane filter (trade name: Durapore (trademark) PVDF Membrane Filter, available from Millipore) with a pore size of 0.45 μm. Then, 8 mL of the obtained filtrate was subjected to a kit (trade name: exoEasy Maxi Kit, available from QIAGEN), vesicles were separated (isolated) by elution using 400 μL of Buffer XE of the kit, and the eluted fraction was ultracentrifuged (100,000×g, 49,000 rpm, 70 minutes, 4° C.) to collect vesicle pellets. The vesicle pellets were suspended in 50 μL of PBS to obtain a vesicular fraction. The vesicular fraction was subjected to a nanoparticle analysis system (trade name:

NanoSight, available from Malvern), and a particle size distribution of vesicles contained in the vesicular fraction was confirmed.

The results of the particle size distribution are shown in the graph in FIG. 1. In FIG. 1, the vertical axis represents the particle concentration (particles/mL), and the horizontal axis represents the particle size (nm). As shown in FIG. 1, the vesicle concentration of the vesicular fraction was $2.2 \times 10^8$ particles/mL, and the particle size was as follows: Average (Mean) 208 nm, Mode 155 nm, SD 108 nm.

(2) Conjugate Formation

The formation of a conjugate of a nucleic acid reagent and vesicles was indirectly confirmed.

miRNA mimics (trade name: Ambion (trademark) miR-340 mimics, available from Thermo Fisher Scientific) targeted to MMP2 were used as the nucleic acid reagent. First, 200 pmol of the miR-340 mimics and 1 mL of the vesicular fraction were mixed, calcium chloride was added thereto to a concentration of 0.1 mol/L, and the mixture was allowed to stand on ice for 30 minutes. Then, a heat shock method was performed in which the mixture was allowed to stand at 42° C. for 1 minute and again on ice for 5 minutes. After that, the resulting mixture was ultracentrifuged to collect a precipitated fraction. The ultracentrifugation was performed under conditions (100,000×g, 49,000 rpm, 70 minutes, 4° C.; the same applies hereinafter) that vesicles were allowed to precipitate and the miRNA mimics were not allowed to precipitate alone. A system in which RNase was added to the precipitated fraction to a concentration of 5 μg/mL and a system in which RNase was not added were prepared and treated at 37° C. for 1 hour. Then, RNA was extracted using a miRNeasy mini kit (trade name, available from QIAGEN), and the miR-340 mimics were measured by qRT-PCR. These systems are denoted by b. The qRT-PCR was performed by adding a spike miRNA (ath-miR-159) as a spike control to a specified amount (0.1 μmol/L), and the spike miRNA was also measured in the same manner (the same applies hereinafter).

To 1 mL of the vesicular fraction to which the miR-340 mimics were not added, calcium chloride was added to a concentration of 0.1 mol/L, and the mixture was allowed to stand on ice for 30 minutes. Then, a heat shock method was performed in which the mixture was allowed to stand at 42° C. for 1 minute and again on ice for 5 minutes. After that, the resulting mixture was ultracentrifuged to collect a precipitated fraction, a system in which RNase was added and a system in which RNase was not added were prepared and treated in the same manner as the systems b, and the measurement was performed. These systems are denoted by a.

200 pmol of the miR-340 mimics and 1 mL of the vesicular fraction were mixed and allowed to stand on ice for 30 minutes. Then, the mixture was ultracentrifuged to collect a precipitated fraction. A system in which RNase was added to the precipitated fraction and a system in which RNase was not added were prepared and treated in the same manner as the systems b, and the measurement was performed. In these systems, calcium chloride was not added, and heat shock treatment was not applied. These systems are denoted by c.

200 pmol of the miR-340 mimics and 1 mL of PBS were mixed and allowed to stand on ice for 30 minutes. Then, a system in which RNase was added to the mixture and a system in which RNase was not added were prepared and treated in the same manner as the systems b, and the measurement was performed. In these systems, the vesicular fraction was not added, calcium chloride was not added, heat shock treatment was not applied, and ultracentrifugation treatment was not applied. These systems are denoted by d.

200 pmol of the miR-340 mimics and 1 mL of PBS were mixed and allowed to stand on ice for 30 minutes. Then, the mixture was ultracentrifuged to remove a liquid fraction. A system in which RNase was added to the residue and a system in which RNase was not added to the residue were prepared and treated in the same manner as the systems b, and the measurement was performed. In these systems, the vesicular fraction was not added, calcium chloride was not added, and heat shock treatment was not applied. These systems are denoted by e.

Figure 2:
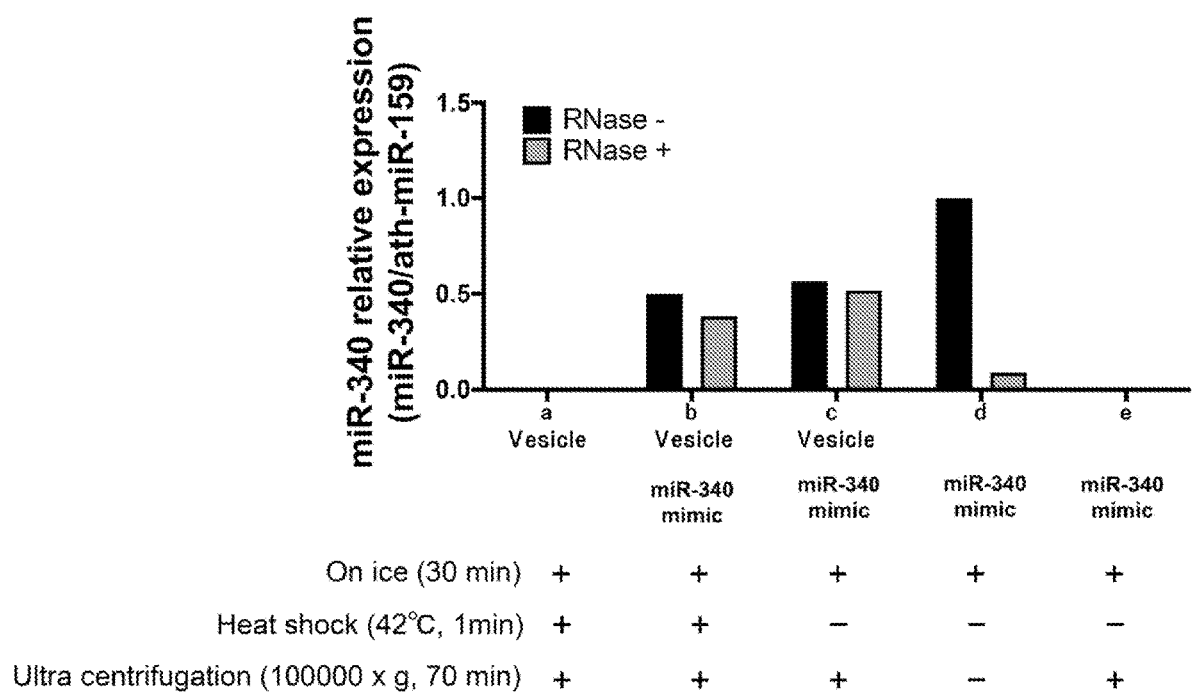
FIG. 2 is a graph showing the expression of a nucleic acid reagent of Example 1.

FIG. 2 shows the results. FIG. 2 is a graph showing the amplification level (detection level) of the miR-340 mimics. The Y axis represents the relative value of the amplification level of the miR-340 mimics. Specifically, for each system, the amplification level of the miR-340 mimics was normalized by the amplification level (detection level) of the spike control, ath-miR-159, and expressed as a value relative to the normalized value of the system d (to which RNase was not added), which was taken as 1. In FIG. 2, a to e indicate the results with respect to the systems a to e, respectively, and the bars on the left side are the results with respect to the RNase-untreated systems (RNase−), while the bars on the right side are the results with respect to the RNase-treated systems (RNase+).

As shown in FIG. 2, in the systems a, since the miR-340 mimics were not added, no amplification was confirmed in either of the RNase− and RNase+ systems. In the systems e, although the mixture before the ultracentrifugation contained free miR-340 mimics, the residue after the ultracentrifugation contained no miR-340 mimics because the vesicular fraction was not added, and no amplification was confirmed. In the systems d, since the ultracentrifugation was not performed, although free miR-340 mimics were contained and amplification was confirmed in the RNase− system, no amplification was confirmed in the RNase+ system due to degradation of the free miR-340 mimics by RNase. In contrast, in the systems b and c, since the vesicles and the miR-340 mimics were allowed to coexist by the addition of the vesicular fraction, amplification of the miR-340 mimics was confirmed in both of the RNase− and RNase+ systems. In other words, it can be said that degradation by RNase was avoided as a result of the conjugate formation between the vesicles and the miR-340 mimics. Moreover, since the systems c exhibited a behavior similar to that of the systems b, it was found that it is possible to form a conjugate by simply allowing the vesicles and the miR-340 mimics to coexist without the need to use, for example, a heat shock method or the like.

(3) Confirmation of Intracellular Uptake

Figure 3:
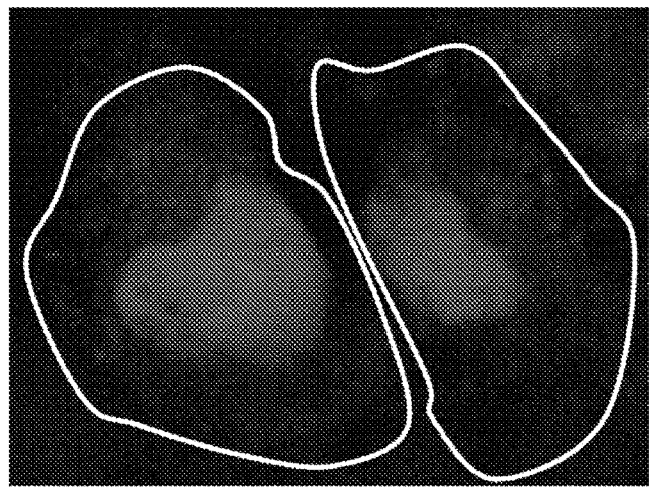
FIG. 3 includes photographs showing the uptake of the nucleic acid reagent using vesicles of Example 1.
Figure 3:
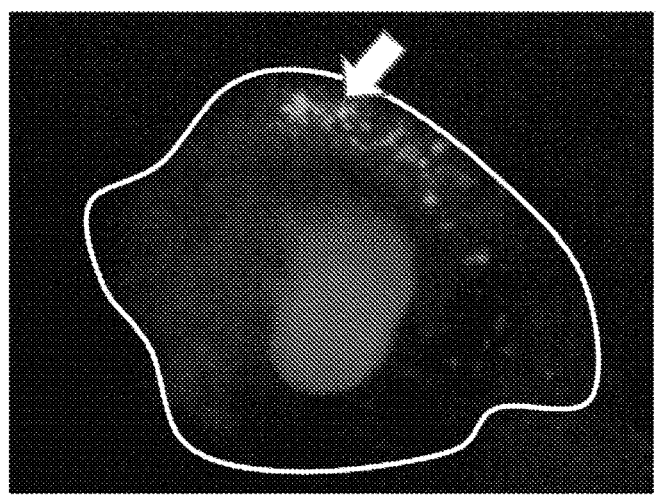
Figure 3:
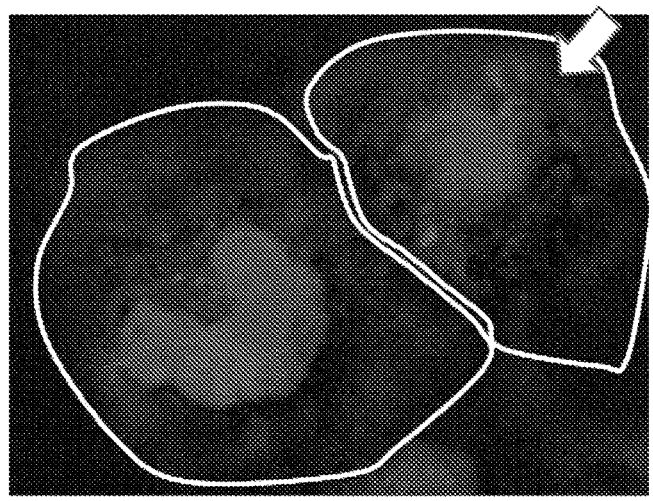

First, 50 pmol of labeled miR-340 mimics that were labeled with FITC and 1 mL of the vesicular fraction were mixed and allowed to stand at 4° C. for 1 hour. The mixture was ultracentrifuged to collect a precipitated fraction, and the precipitated fraction was suspended in 50 μL of PBS (pH 7.2). This suspension was further diluted with the PBS to 1/10 to prepare a diluted solution. On the other hand, cervical cancer-derived cells, SiHa, were cultured in a DMEM+10% fetal bovine serum (FBS) medium, 5 μL of the diluted solution was added to 500 μL of the culture solution, and the mixture was incubated for 24 hours in a $CO_2$ incubator at 37° C. The cultured cells were observed under a fluorescence microscope. Cell nuclei were stained with DAPI. As comparative examples, cells were cultured and observed in the same manner except for using only the vesicular fraction or only the labeled miR-340 mimics. FIG. 3 shows the results.

FIG. 3 includes magnified fluorescence micrographs, and the white lines each indicate the outline of a single cell. The fluorescence micrograph A shows the results in the case where only the vesicles were used, the fluorescence micrograph B shows the results in the case where the vesicles and the labeled miR-340 mimics were used, and the fluorescence micrograph C shows the results in the case where only the labeled miR-340 mimics were used. In FIG. 3, in the fluorescence micrograph A, although fluorescence of DAPI indicating the cell nuclei was confirmed in the center of the cells, fluorescence of FITC was not confirmed in the cells because the labeled miR-340 mimics were not added. In the fluorescence micrograph C, although fluorescence of FITC was confirmed because the labeled miR-340 mimics were added, the fluorescence was sparse because the labeled miR-340 mimics were not introduced by vesicles. In contrast, in the fluorescence micrograph B, vesicle-shaped fluorescence of FITC was confirmed in the cell. From this, it was found that the labeled miR-340 mimics and the vesicles were taken up into the cells in a state in which the labeled miR-340 mimics and the vesicles formed a conjugate.

(4) In Vitro Function to Target: SiHa

First, 50 pmol of the miR-340 mimics and 1 mL of the vesicular fraction were mixed and allowed to stand at 4° C. for 1 hour. The mixture was ultracentrifuged to collect a precipitated fraction, and the precipitated fraction was suspended in 50 µL of PBS (pH 7.2). This suspension was further diluted with the PBS to 1/10 to prepare a diluted solution. On the other hand, cervical cancer-derived cells, SiHa, were cultured in a DMEM+10% FBS medium, 5 µL of the diluted solution was added to 500 µL of the culture solution, and the mixture was incubated for 24 hours in a $CO_2$ incubator at 37° C. The cultured cells were washed with PBS, RNA was extracted from the cells, and the miR-340 mimics were measured by qRT-PCR. Moreover, mRNA expression of MMP2, which was the target of the miR-340 mimics, was also measured.

For comparison, the following systems were also analyzed in the same manner: a system in which only the vesicular fraction was used without adding the miR-340 mimics; a system in which 50 pmol of a nucleic acid (nega-miR, available from Thermo Fisher Scientific) that does not have the ability to suppress expression was used instead of the miR-340 mimics; and a system in which only the miR-340 mimics were used without adding the vesicular fraction.

Figure 4:
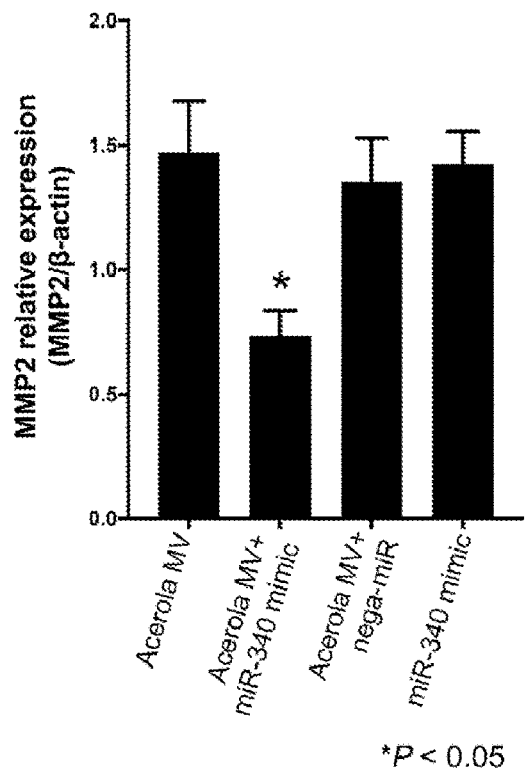
FIG. 4 is a graph showing the uptake of the nucleic acid reagent using vesicles of Example 1 into SiHa cells and the suppression of expression of a target.

FIG. 4 shows the results. FIG. 4 is a graph showing the relative values of MMP2 expression level, and the Y axis represents the value (relative value) obtained by normalizing the MMP2 expression level with the expression level of beta-actin, which is a housekeeping gene. In FIG. 4, Acerola MV means the vesicular fraction (the same applies to other figures below). As with the results described in the section (3) above, the miR-340 mimics were detected from the cells (not shown) only in the system in which the conjugate of the vesicles and the miR-340 mimics was used. Also, as shown in FIG. 4, suppression of the expression of MMP2, which was the target of the miR-340 mimics, was confirmed only in the system (Acelora MV+miR-340 mimic) in which the conjugate of the vesicles and the miR-340 mimics was used. It can be seen from these results that the miR-340 mimics were taken up by the cells by forming the conjugate with the vesicles, and exerted their function of suppressing the expression of the target.

(5) In Vitro Function to Target: NHDF

First, 50 pmol of a nucleic acid reagent, miR-146a mimics (trade name: Ambion (trademark) miR-146a mimics, available from Thermo Fisher Scientific) targeted to a NF-κB gene, and 1 mL of the vesicular fraction were mixed and allowed to stand at 4° C. for 1 hour. The mixture was ultracentrifuged to collect a precipitated fraction containing a conjugate of the miR-146a mimics and the vesicles, and the precipitated fraction was suspended in 50 µL of PBS (pH 7.2). This suspension was further diluted with the PBS to 1/10 to prepare a diluted solution. On the other hand, normal human dermal fibroblasts, NHDF, were cultured in a DMEM+10% FBS medium in the same manner as in the section (4) above, 5 µL of the diluted solution was added to 500 µL of the culture solution, and the mixture was incubated for 24 hours in a $CO_2$ incubator at 37° C. The cultured cells were washed with PBS, RNA was extracted from the cells, and the miR-146a mimics were measured by qRT-PCR (ADENs+miR-146a mimic). Moreover, mRNA expression of NF-κB, which was the target of the miR-340 mimics, was also measured.

In addition, the following systems were also measured in the same manner: a system (ADENs) in which only the vesicular fraction was used without adding the miR-146a mimics; a system (ADENs+nega-miR) in which a nucleic acid (nega-miR, available from Thermo Fisher Scientific) that does not have the ability to suppress expression was used instead of the miR-146a mimics; and a system (miR-146a mimic) of the miR-146a mimics to which the vesicular fraction was not added.

Figure 5:
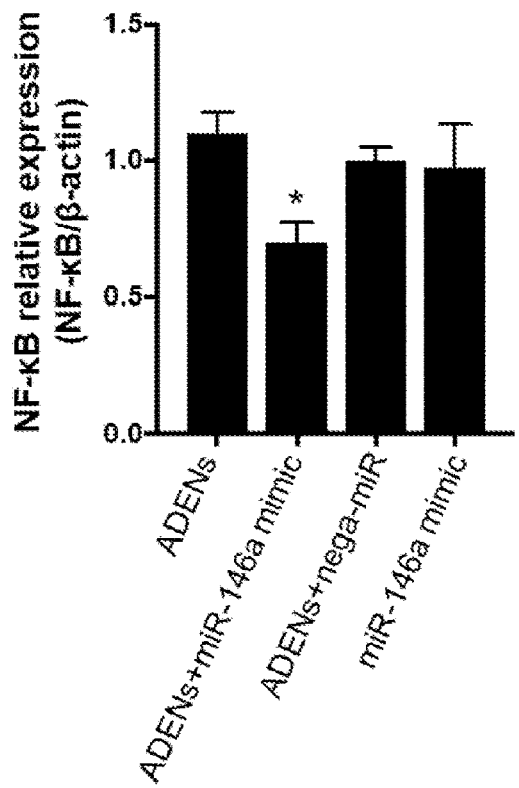
FIG. 5 is a graph showing the uptake of the nucleic acid reagent using vesicles of Example 1 into NHDF cells and the suppression of expression of a target.

FIG. 5 shows the results. FIG. 5 is a graph showing the relative values of NF-κB expression level, and the Y axis represents the value (relative value) obtained by normalizing the NF-κB expression level with the expression level of beta-actin, which is a housekeeping gene. As with the results with respect to SiHa described in the section (4) above, the miR-146a mimics were detected from the cells (not shown) only in the system in which the conjugate of the vesicles and the miR-146a mimics was used. Also, as shown in FIG. 5, suppression of the expression of NF-κB, which was the target of the miR-146a mimics, was confirmed only in the system (ADENs+miR-146a mimic) in which the conjugate of the vesicles and the miR-146a mimics was used. It can be seen from these results that the miR-146a mimics were taken up by the cells by forming the conjugate with the vesicles, and exerted their function of suppressing the expression of the target. Moreover, from the results in the section (4) above and in this section (5), it was confirmed that the above-described vesicles can form a conjugate with a nucleic acid reagent and introduce the nucleic acid reagent into cells irrespective of the type of the nucleic acid reagent and the type of the cells.

Example 2

The vesicular fraction of Example 1 above was used as acerola-derived vesicles, and the function of the vesicles as a nucleic acid carrier was confirmed. Unless otherwise specified, the conditions were the same as those in Example 1 above.

(1) First, 1 mL of the vesicular fraction and 200 pmol of the nucleic acid reagent (miR-340 mimics) were mixed, calcium chloride was added thereto, and the mixture was allowed to stand on ice for 30 minutes. Then, the heat shock method was performed. After that, the resulting mixture was ultracentrifuged (100,000×g, 49,000 rpm, 70 minutes, 4° C.), RNA was extracted from the obtained precipitated fraction, and the miR-340 mimics were measured by qRT-PCR. In addition to this system (calcium chloride (+)/cooling on ice (+)/heat shock (+)), the following systems in which the conditions were changed were measured in the same manner.

Calcium chloride (+)/Cooling on ice (+)/Heat shock (+)
Calcium chloride (−)/Cooling on ice (+)/Heat shock (+)
Calcium chloride (−)/Cooling on ice (+)/Heat shock (−)

Figure 6:
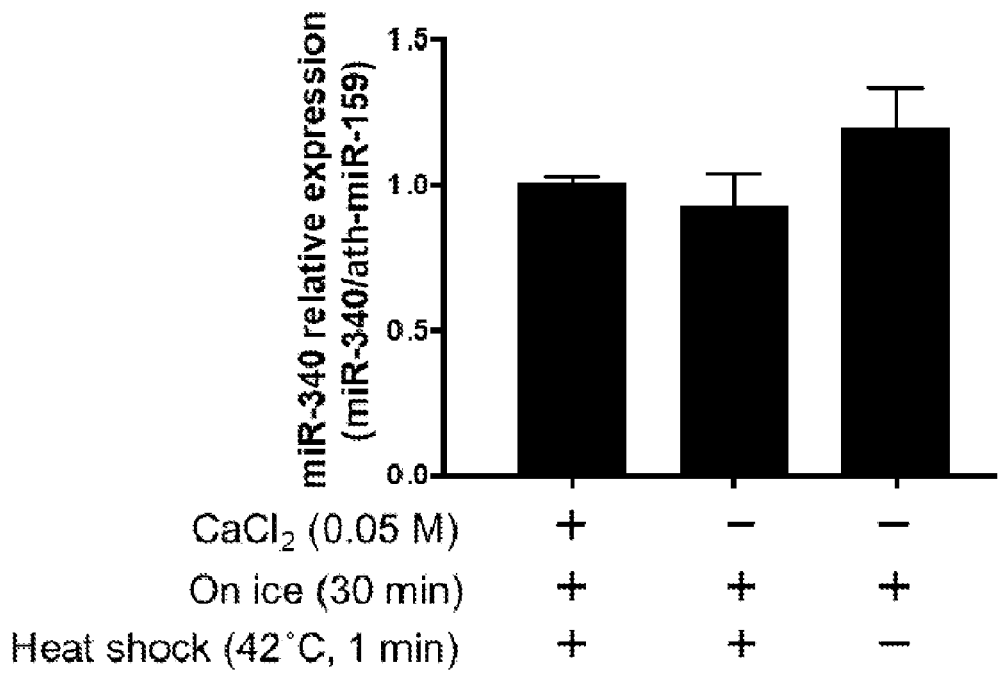
FIG. 6 is a graph showing the results of confirming the conjugate formation between vesicles and a nucleic acid reagent by comparing amplification levels of the nucleic acid reagent in Example 2.

FIG. 6 shows the results. FIG. 6 is a graph showing the amplification level (detection level) of the miR-340 mimics for each system. The Y axis represents the relative value of the amplification level of the miR-340 mimics. Specifically, for each system, the amplification level of the miR-340 mimics was normalized in the same manner as in Example 1 above and expressed as a value relative to the normalized value of the calcium chloride (+)/cooling on ice (+)/heat shock (+) system, which was taken as 1. As shown in FIG. 6, even in the case where the heat shock treatment was performed without adding calcium chloride, amplification of the miR-340 mimics was observed in the RNA collected from the precipitated fraction after the ultracentrifugation, and furthermore, in the case where calcium chloride was not added and the heat shock treatment was not performed, a higher relative value was obtained. From this, it was found that the conjugate formation between the miR-340 mimics and the vesicles can be performed by simply allowing the miR-340 mimics and the vesicles to coexist.

(2) First, 200 pmol of the above-described nucleic acid reagent, miR-340 mimics, and 1 mL of the vesicular fraction were mixed, and the mixture was allowed to stand on ice for 30 minutes (cooling on ice) and then ultracentrifuged (UC, 100,000 xg, 49,000 rpm, 70 minutes, 4° C.) to collect a precipitated fraction. RNA was extracted from the precipitated fraction, and the miR-340 mimics were measured by qRT-PCR. Note that calcium chloride was not added, and the heat shock treatment was not applied. In addition to this system (vesicle (+)/miRNA mimic (+)/cooling on ice (+)/UC (+)), the following systems in which the conditions were changed were also measured. "Vesicle (−)" means that 1 mL of PBS was used instead of the vesicular fraction, "miRNA mimic (−)" means that only the vesicular fraction was used without adding the miR-340 mimics, and "UC (−)" means a system in which RNA was extracted after the cooling on ice, without performing the ultracentrifugation.

Vesicle (+)/miRNA mimic (+)/Cooling on ice (+)/UC (+)
Vesicle (+)/miRNA mimic (+)/Cooling on ice (+)/UC (−)
Vesicle (+)/miRNA mimic (−)/Cooling on ice (+)/UC (+)
Vesicle (+)/miRNA mimic (−)/Cooling on ice (+)/UC (−)
Vesicle (−)/miRNA mimic (+)/Cooling on ice (+)/UC (+)
Vesicle (−)/miRNA mimic (+)/Cooling on ice (+)/UC (−)

Figure 7:
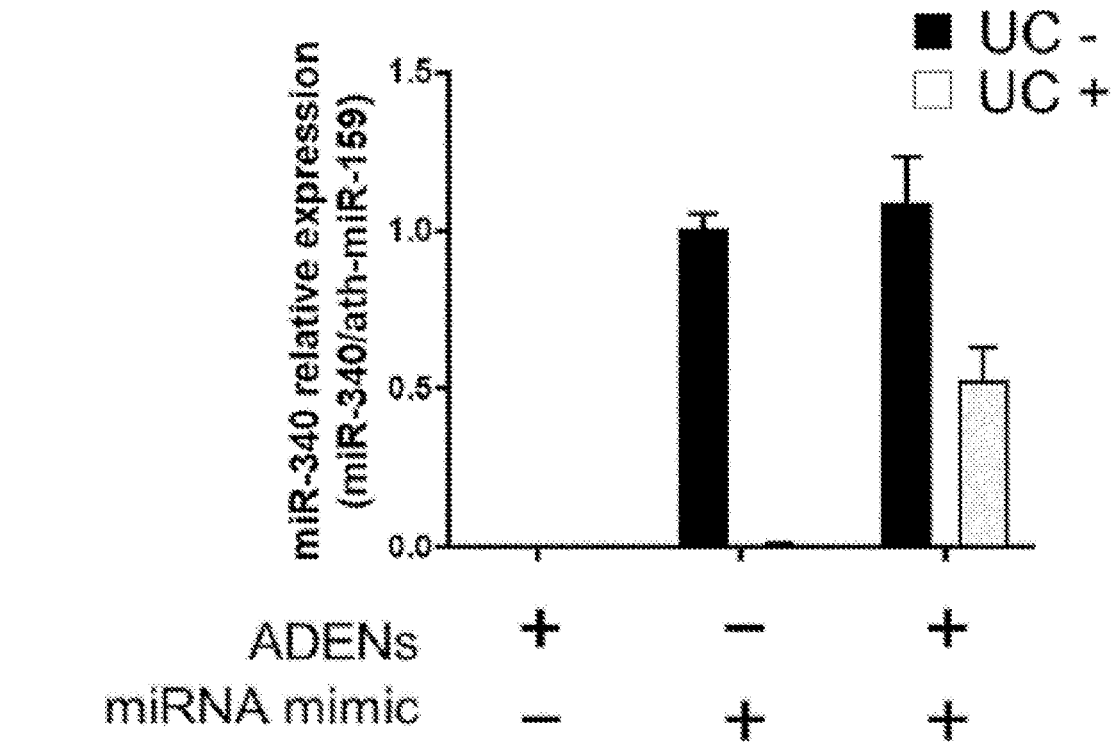
FIG. 7 is a graph showing the results of confirming the effects of heat shock and cooling on ice on the conjugate formation, based on amplification levels of the nucleic acid reagent in Example 2.

FIG. 7 shows the results. FIG. 7 is a graph showing the amplification level (detection level) of the miR-340 mimics for each system. The Y axis represents the relative value of the amplification level of the miR-340 mimics. Specifically, for each system, the amplification level of the miR-340 mimics was normalized in the same manner as in Example 1 above and expressed as a value relative to the normalized value of the vesicle (−)/miRNA mimic (+)/cooling on ice (+)/UC (−) system, which was taken as 1. In FIG. 7, "ADENs" means the vesicular fraction in Example 1 above, that is, acerola-derived exosome-like vesicles (acerola derived exosome like nanoparticles) (the same applies to other figures below). As shown in FIG. 7, in the systems (vesicle (+)/miRNA mimic (−)) in which the miRNA mimics were not added, no amplification of the miR-340 mimics was observed irrespective of whether or not the ultracentrifugation was performed (UC (+) or (−)). In the systems (vesicle (−)/miRNA mimic (+)) in which the vesicular fraction was not added, amplification of the miR-340 mimics was observed in the case where the ultracentrifugation was not applied (UC (−)), but no amplification of the miR-340 mimics was observed in the case where the ultracentrifugation was applied (UC (+)). On the other hand, in the systems (vesicle (+)/miRNA mimic (+)) in which the vesicular fraction and the miRNA mimics were added, amplification of the miR-340 mimics was observed even in the case where the ultracentrifugation was performed (UC (+)), although the amplification level was slightly lower than that in the case where the ultracentrifugation was not performed (UC (−)). Since the miRNA mimics were not allowed to precipitate alone under the conditions that the ultracentrifugation was performed, the fact that, due to the coexistence with the vesicular fraction, amplification of the miRNA mimics was observed in the precipitated fraction obtained by the ultracentrifugation means that the miRNA mimics and the vesicles formed a conjugate.

(3) With respect to the calcium chloride (−)/cooling on ice (+)/heat shock (−) system in the section (1) above, the standing time of cooling on ice was varied, and the measurement was performed in the same manner. In addition, as a calcium chloride (−)/cooling on ice (−)/heat shock (−) system, the mixture was allowed to stand at room temperature (25° C.) instead of being cooled on ice, and the standing time was varied. Then, the measurement was performed in the same manner.

Figure 8:
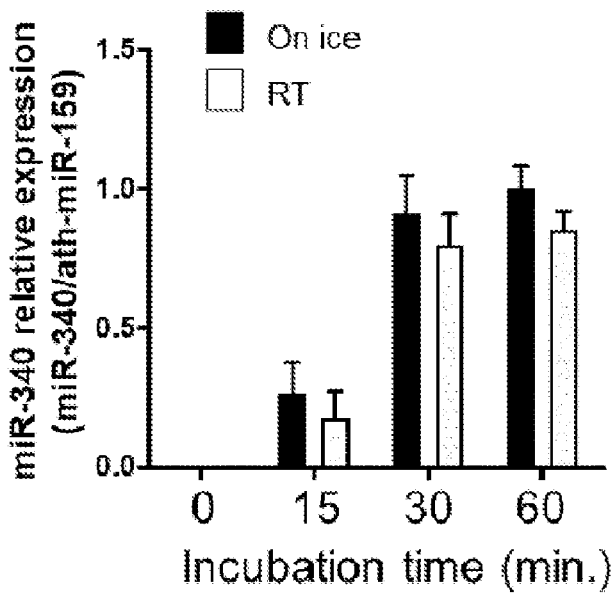
FIG. 8 is a graph showing the results of confirming the effects of incubation conditions on the conjugate formation, based on amplification levels of the nucleic acid reagent in Example 2.

FIG. 8 shows the results. FIG. 8 is a graph showing the amplification level (detection level) of the miR-340 mimics for each system. The Y axis represents the relative value of the amplification level of the miR-340 mimics. Specifically, for each system, the amplification level of the miR-340 mimics was normalized in the same manner as in Example 1 above and expressed as a value relative to the normalized value of the system of cooling on ice (+) for 60 minutes, which was taken as 1. As shown in FIG. 8, in the case where the nucleic acid reagent and the vesicular fraction were mixed, amplification of the miR-340 mimics was observed irrespective of whether the mixture was allowed to stand on ice or at room temperature. Since the amplification levels in the case where the mixture was allowed to stand on ice were slightly higher than those in the case where the mixture was allowed to stand at room temperature, it can be considered that, for example, as a result of the mixture being allowed to stand on ice, the nucleic acid reagent was further protected from degradation until the conjugate formation between the nucleic acid reagent and the vesicles of the vesicular fraction.

(4) With respect to the calcium chloride (−)/cooling on ice (+)/heat shock (−) system in the section (1) above, the measurement was performed in the same manner, except that the vesicular fraction was added in amounts of ½, ¹⁄₁₀, and ¹⁄₅₀ relative to the amount added in the section (1) above, which was taken as a relative value of 1.

Figure 9:
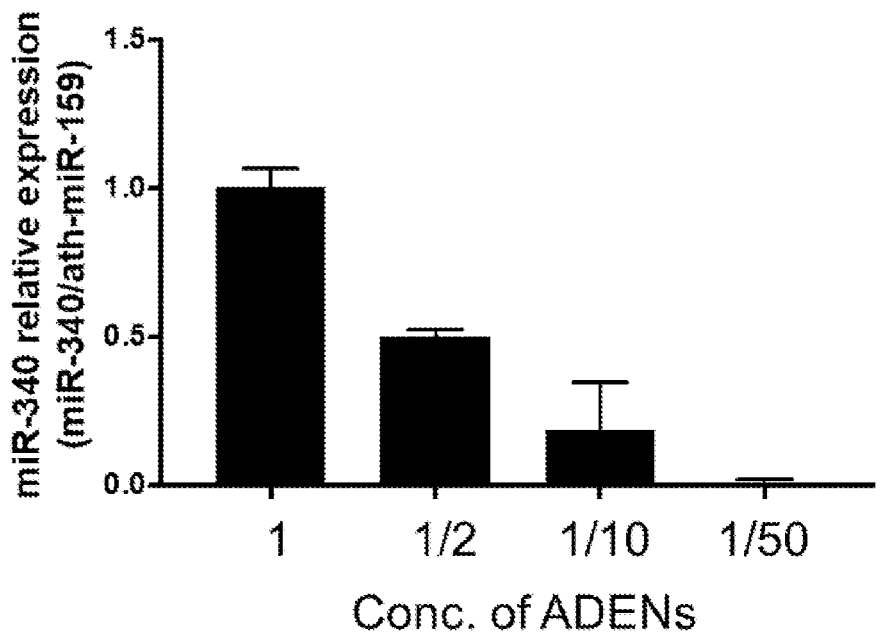
FIG. 9 is a graph showing the results of confirming correlations between the conjugate formation and the amount of vesicles added, based on amplification levels of the nucleic acid reagent in Example 2.

FIG. 9 shows the results. FIG. 9 is a graph showing the amplification level (detection level) of the miR-340 mimics for each system. The Y axis represents the relative value of the amplification level of the miR-340 mimics. Specifically, for each system, the amplification level of the miR-340 mimics was normalized in the same manner as in Example 1 above and expressed as a value relative to the normalized value of the system in which the relative value of the amount of the vesicular fraction added was 1, where this normalized value was taken as 1. As shown in FIG. 9, in terms of the amount of the vesicular fraction added, the amplification level increased in a concentration-dependent manner.

(5) In the present example, 50 μL of the vesicular fraction (2.2×10⁸ particles/mL) of Example 1 was mixed with 50 pmol of a nucleic acid reagent (miR-340 mimics) so that the final concentration of miR-340 mimics in the mixed solution was 1 pmol/μL (1 μmol/L). The mixed solution was incubated on ice for 30 minutes and then ultracentrifuged (100,000 xg, 49,000 rpm, 70 minutes, 4° C.) to thereby collect a precipitated fraction as a conjugate of the vesicles and the miR-340 mimics. RNA was extracted from the precipitated fraction, and the miR-340 mimics were measured by qRT-PCR. On the other hand, as a control, RNA was extracted from the incubated mixed solution in the same manner, except that the ultracentrifugation was not performed, and the miR-340 mimics were measured. The measured amplification level was normalized in the same manner as in Example 1 above, and the relative value of the amplification level of the example was obtained with respect to the normalized value of the control, which was taken as 100%. As a result, the relative value of the amplification level of the example was 60%.

The above-described control contained all miR-340 mimics. On the other hand, in the above-described example, since free miR-340 mimics were removed by the ultracentrifugation, the amplification level was an amplification level of miR-340 mimics that formed the conjugate. Therefore, it was found that, under the conditions of the present example, 30 pmol of miR-340 mimics can be used as a conjugate with 1.1×10⁷ particles of vesicles.

Example 3

The effect of acerola-derived vesicles on the resistance of a nucleic acid reagent was confirmed. Unless otherwise specified, the conditions were the same as those in Example 1 or 2 above.

In Example 3, in the same manner as in the section (2) of Example 2 above, the nucleic acid reagent, miR-340 mimics, and the vesicular fraction were mixed and allowed to stand on ice for 30 minutes, and then the mixture was ultracentrifuged to collect a precipitated fraction without performing the calcium chloride treatment and the heat shock treatment. The precipitated fraction was treated under predetermined conditions by adding various damaging reagents (RNase, HCl, and NaOH) that damage nucleic acids. Then, RNA was extracted, and the miR-340 mimics were measured by qRT-PCR. As a control of the example, RNA was extracted without adding the various damaging reagents, and the measurement was performed in the same manner.

RNase, HCl, and NaOH were used as the reagents. The RNase was added to the precipitated fraction to a concentration of 5 μg/mL, and treatment was performed at 37° C. for 1 hour. Then, RNA was extracted. The HCl was added to the precipitated fraction to a concentration of 1×10⁻² mol/L (pH 2), and treatment was performed at 37° C. for 1 hour. Then, RNA was extracted. The NaOH was added to the precipitated fraction to a concentration of 1×10⁻² mol/L (pH 10), and treatment was performed at 37° C. for 1 hour. Then, RNA was extracted.

As a comparative example, the nucleic acid reagent, miR-340 mimics, was treated under predetermined conditions by adding the various damaging reagents (RNase, HCl, and NaOH) and without adding the vesicular fraction. Then, RNA was extracted, and the miR-340 mimics were measured by qRT-PCR. The above-described various reagents were added to the nucleic acid reagent in the same amounts as the amounts added to the precipitated fraction in the above-described example, and the treatment conditions were the same. As a control of the comparative example, RNA was extracted without adding the various damaging reagents, and the measurement was performed in the same manner.

Figure 10:
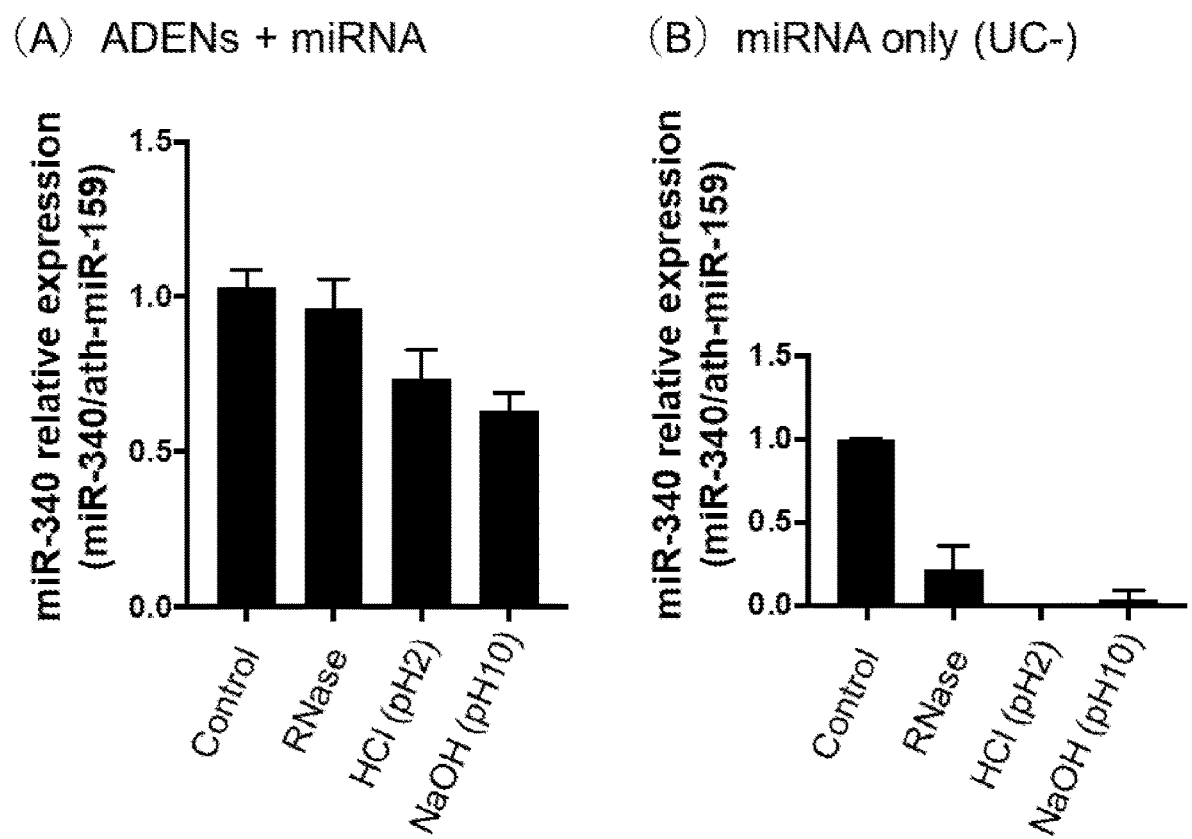
FIG. 10 includes graphs showing the results of confirming the suppression of degradation of a nucleic acid reagent by vesicles, based on amplification levels of the nucleic acid reagent in Example 3.

FIG. 10 shows the results. FIG. 10(A) is a graph showing the amplification levels (detection levels) of the miR-340 mimics in the example, and FIG. 10(B) is a graph showing the amplification levels (detection levels) of the miR-340 mimics in the comparative example. The Y axis of each graph represents the relative value of the amplification level of the miR-340 mimics. In each case, the amplification level of the miR-340 mimics was normalized in the same manner as in Example 1 above and expressed as a value relative to the normalized value of the control, which was taken as 1. As shown in FIG. 10(B), in the case of the comparative example, in which the miR-340 mimics were used alone, the amplification level of the miR-340 mimics markedly decreased in all the cases where the miR-340 mimics were treated with the respective reagents (RNase, HCl, and NaOH). On the other hand, as shown in FIG. 10(A), in the example, as a result of allowing the miR-340 mimics and the vesicular fraction to coexist, unlike the comparative example, no marked decrease in the amplification level of the miR-340 mimics was observed in any of the cases where the treatment was performed with the respective reagents, and an amplification level not less than half of that of the control was maintained. From this result, it was found that, due to the addition of the vesicular fraction, the vesicles and the miR-340 mimics form a conjugate, and thus, degradation of the miR-340 mimics by various damaging reagents can be suppressed.

Example 4

First, 50 pmol of a luc siRNA (trade name: anti-luc siRNA, available from Gene Design) that is targeted to a luciferase gene and 1 mL of the vesicular fraction in Example 1 above were mixed, and the mixture was allowed to stand at 4° C. for 1 hour. The mixture was ultracentrifuged to collect a precipitated fraction, and the precipitated fraction was suspended in 50 μL of PBS (pH 7.2). On the other hand, luc forced-expressing cells (3LL-luc, which was obtained from the JCRB cell bank and into which a luciferase gene was introduced) were cultured in a DMEM+10% FBS medium in a well plate, 5 μL of the suspension was added to 500 μL of the culture solution, and the mixture was incubated for 24 hours in a CO₂ incubator at 37° C. The luciferase activity in the cultured cells was measured. The measurement of the luciferase activity in the cells was performed in the following manner. First, 100 μL of a Bio-Glo reagent (trade name, available from Promega) was added to the culture solution after the incubation, and the mixture was allowed to stand in the dark at room temperature for 15 minutes. Then, the luciferase activity was measured using a luminometer (available from Tecan). In addition, with regard to cells cultured in another well plate under the same conditions as described above, the number of cells was measured using a CellTiter-Glo 2.0 assay (trade name, available from Promega). Moreover, as controls, in a luc siRNA (−)/vesicle (+) system and a luc siRNA (+)/vesicle (−) system, the luciferase activity and the number of cells were measured in the same manner.

Figure 11:
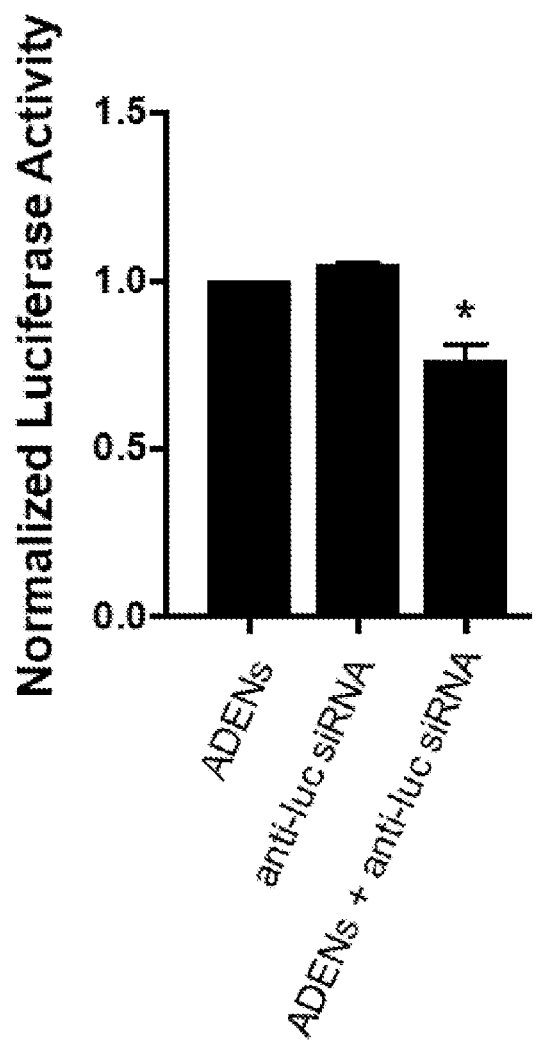
FIG. 11 is a graph showing the introduction of a nucleic acid reagent into cells through conjugate formation in Example 4.

FIG. 11 shows the results. FIG. 11 is a graph showing the luciferase activity, and the Y axis represents the luciferase activity normalized by the number of cells. In FIG. 11, * indicates P<0.05. As shown in FIG. 11, the luciferase activity significantly decreased when the vesicular fraction and the siRNA were used together.

Example 5

The in vivo DDS effect of acerola-derived vesicles was confirmed.
(1) Administration of Vesicles First, 2 mL of the vesicular fraction ($2.2 \times 10^8$ particles/mL) of Example 1 was treated with a fluorescent cell membrane staining dye, PKH26, to fluorescently label the vesicles contained in the fraction. The vesicular fraction treated with PKH26 was ultracentrifuged (conditions: 100,000×g, 49,000 rpm, 70 minutes, 4° C.) to collect a precipitated fraction containing the fluorescently labeled vesicles, and the whole amount was suspended in 200 µL of PBS. The whole amount of the suspension of the fluorescently labeled vesicles was orally administered to a plurality of wild-type mice (female, 8 weeks old, C57/BL) using a gastric tube. Then, detection of fluorescence signals from the individual mice was performed over time (at 1 hour, 3 hours, and 6 hours) using an in vivo fluorescence detection device (trade name: IVIS, available from Summit Pharmaceuticals International Corporation).

Figure 12:
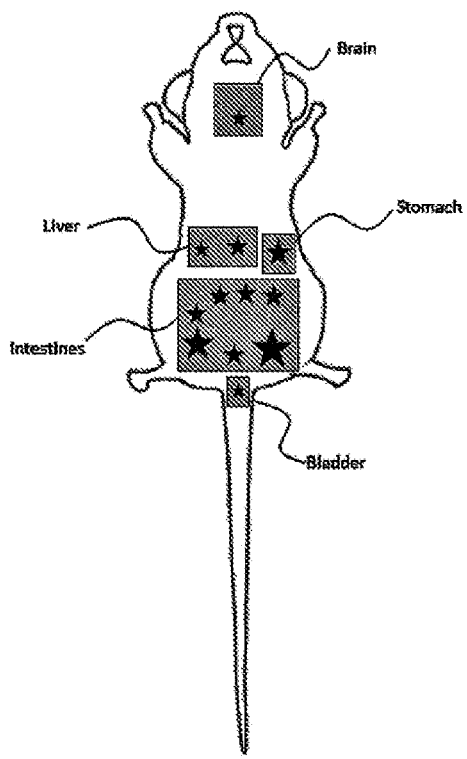
FIG. 12 is a schematic diagram showing the introduction of a nucleic acid reagent into mice through conjugate formation in Example 5.

FIG. 12 is a schematic diagram of imaging showing fluorescence signals in various organs of the mice, and FIG. 12 shows those sites that exhibited particularly prominent fluorescence signals in fluorescence signal imaging images. In FIG. 12, each star means that a fluorescence signal was confirmed, and the size of the star indicates the relative magnitude of the fluorescence signal, and the number of stars indicates the extent of the distribution of fluorescence signals in each organ. FIG. 12 shows the results that were obtained 1 hour after the administration, and the shaded regions are the regions that exhibited fluorescence. As shown in FIG. 12, fluorescence signals were confirmed in various regions (brain, liver, stomach, intestinal tract, and bladder), and thus, it was found that the labeled vesicles had been delivered to the various regions within 1 hour after the administration. As time further passed, the fluorescence signals were attenuated, but a fluorescence signal was confirmed locally in the rectum even 6 hours after the administration.

(2) Delivery of Nucleic Acid Reagent by Vesicles

First, 200 pmol of *Arabidopsis* miRNA (ath-miR-159) as the nucleic acid reagent and 2 mL of the vesicular fraction were mixed, and the mixture was allowed to stand on ice for 30 minutes (cooling on ice). Then, the whole amount was orally administered to mice in the same manner as in the section (1) above. One hour after the oral administration, organs were removed from the mice, RNA was extracted, and ath-miR-159 in the organs was detected by qRT-PCR. As a control, mice to which only the ath-miR-159 was administered were subjected to the detection in the same manner.

Figure 13:
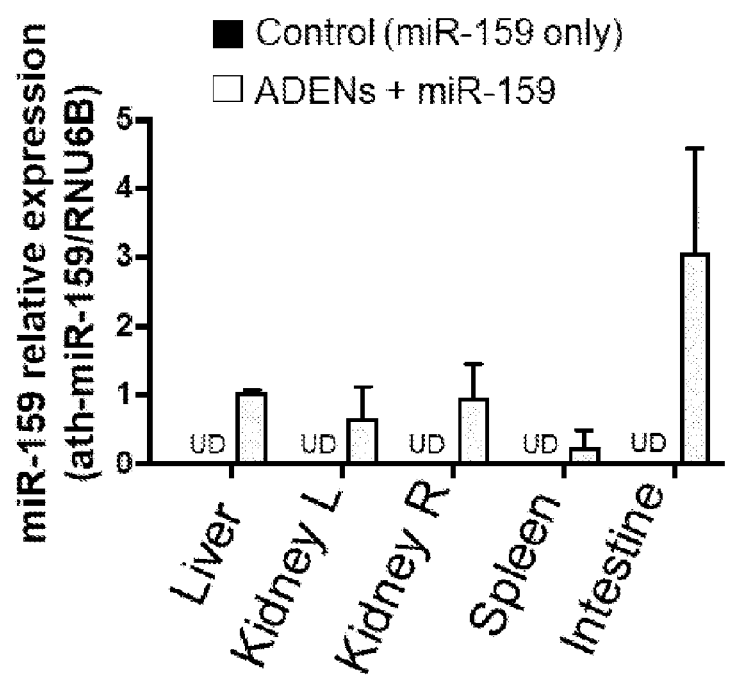
FIG. 13 is a graph showing amplification levels of a nucleic acid reagent in organs when the nucleic acid reagent was introduced (administrated) into mice through conjugate formation in Example 5.

FIG. 13 shows the results. FIG. 13 is a graph showing relative values of the amplification level (detection level) of the ath-miR-159 in the organs, and the Y axis represents the value (relative value) of the amplification level of the ath-miR-159 normalized by the amplification level of an endogenous control small RNA, RNU6B. As shown in FIG. 13, in the mice to which only the ath-miR-159 was administered, ath-miR-159 was below the detection limit in all the organs and was not detected (undetect, UD). On the other hand, in the mice to which the above-described conjugate was administered, in the organs (liver and intestinal tract such as small intestine) in which strong fluorescence signals were confirmed in the section (1) above, expression of the ath-miR159 was similarly confirmed. In addition, the ath-miR159 was also confirmed in the kidney and the spleen.

(3) Expression of the Function of Delivered Nucleic Acid Reagent

In the section (2) above, it was confirmed that the vesicles were capable of delivering the nucleic acid reagent in vivo. Therefore, whether or not the delivered nucleic acid reagent was functional at the site of delivery was confirmed.

The nucleic acid reagent and the vesicular fraction were mixed and cooled on ice for 30 minutes, and the whole amount was orally administered to mice, in the same manner as in the section (2) above, except that the same nucleic acid reagent, luc siRNA, as in Example 4 above was used as the nucleic acid reagent. Luciferase transgenic mice (luc-Tg/C57BL/6J, 12 weeks old) were used as the mice. Then, 1 hour after the administration, the luciferase activity in the individual mice and in various organs after dissection was measured in the same manner as in the section (1) above using a detection device (trade name: IVIS) (ADENs+luc siRNA). As controls, only PBS was orally administered, and the luciferase activity was measured in the same manner (Control).

Figure 14:
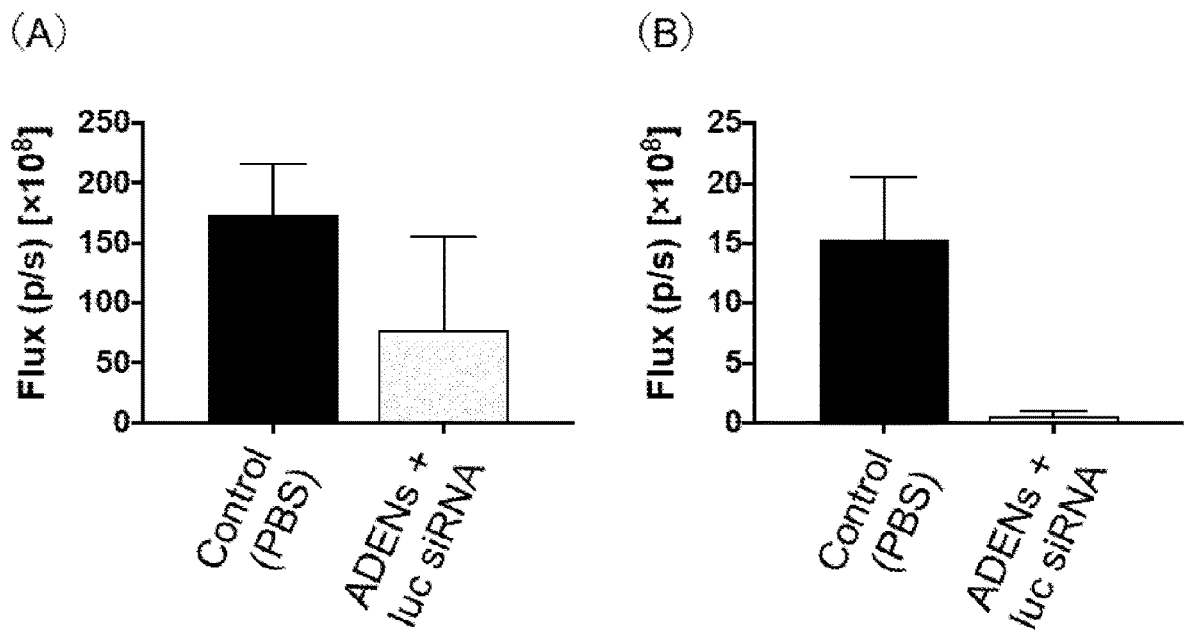
FIG. 14 includes graphs confirming the function of a nucleic acid reagent introduced into mice as a conjugate in Example 5.

FIG. 14 shows the results. FIG. 14(A) is a graph showing the luminance (Flux) of the individual whole mice before the dissection, and FIG. 14(B) is a graph showing the total luminance of the removed organs (brain, lung, liver, kidney, spleen, intestine, and ovarian region including bladder). In each graph, the Y axis represents the luminance (Flux, unit: $\times 10^8$ p/s). As shown in FIGS. 14(A) and 14(B), the luminance, which indicates the luciferase activity, of the mice to which the conjugate was administered significantly decreased, compared with that of the controls. FIG. 14(B) shows the total luminance with respect to the organs in which the delivery of the nucleic acid reagent was confirmed in the section (2) above. Therefore, regarding the results of the administration of the conjugate (ADENs+luc siRNA), when a comparison was made between the luminance of the individual mice in FIG. 14(A) and the total luminance of the organs in FIG. 14(B), a marked decrease in the luminance was confirmed in FIG. 14(B) relative to the respective control. From this result, it was found that, due to the formation of the conjugate, the nucleic acid was delivered to the respective organs and suppressed the expression of luciferase.

Example 6

Vesicles derived from lemon fruit and grapefruit fruit were isolated.

In the same manner as in Example 1 above, a juice squeezed from fully ripe lemon fruit and a juice squeezed from fully ripe grapefruit fruit were used to prepare respective vesicular fractions, and the particle size distribution of vesicles contained in each vesicular fraction was confirmed. The vesicle concentration of the vesicular fraction derived from lemon was $1.84 \times 10^{11}$ particles/mL, and the particle size thereof was as follows: Average (Mean) 113.7 nm, Mode 79.1 nm, and SD 66.8 nm. The vesicle concentration of the vesicular fraction derived from grapefruit was 7.37×

$10^{12}$ particles/mL, and the particle size thereof was as follows: Average (Mean) 95.7 nm, Mode 61.9 nm, and SD 30.5 nm.

The effect of the lemon-derived vesicles or the grapefruit-derived vesicles on the resistance of a nucleic acid reagent was confirmed. Specifically, the measurement of the nucleic acid reagent, miR-340 mimics, was performed in the same manner as in Example 3 above, except that the vesicular fraction derived from lemon and the vesicular fraction derived from grapefruit were used instead of the vesicular fraction derived from acerola. As controls of the present example, the measurement was performed in the same manner, except that the above-described various damaging reagents were not added as in the case of the controls of Example 3.

Moreover, the comparative example (see FIG. 10(B)) for Example 3 above was used as a comparative example for the example in which the lemon-derived vesicles or the grapefruit-derived vesicles were used.

Figure 15:
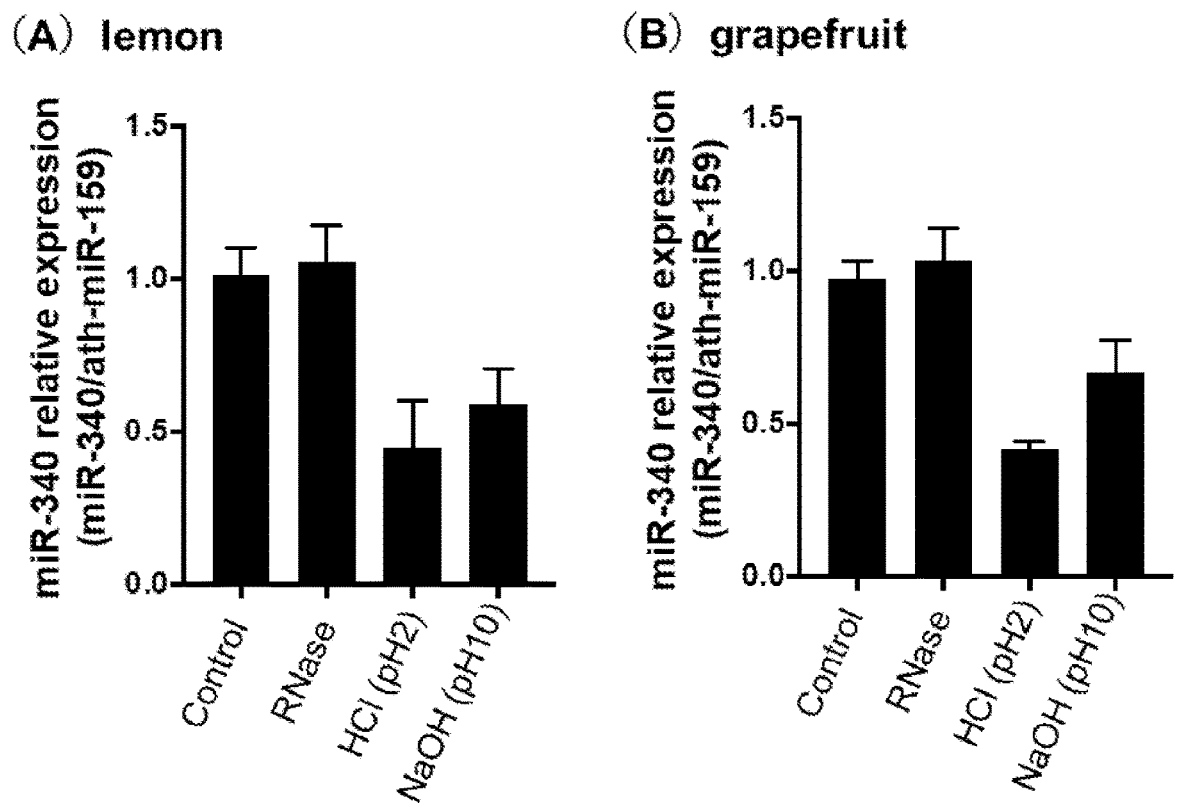
FIG. 15 includes graphs showing the results of confirming the suppression of degradation of a nucleic acid reagent by vesicles, based on amplification levels of a nucleic acid reagent in Example 6.

FIG. 15 shows the results. FIG. 15(A) is a graph showing the amplification levels (detection levels) of the miR-340 mimics in the example in which the vesicular fraction derived from lemon was used, and FIG. 15(B) is a graph showing the amplification levels (detection levels) of the miR-340 mimics in the example in which the vesicular fraction derived from grapefruit was used. The Y axis of each graph represents the relative value of the amplification level of the miR-340 mimics. In each case, the amplification level of the miR-340 mimics was normalized in the same manner as in Example 1 above and expressed as a value relative to the normalized value of the respective control, which was taken as 1.

As shown in FIG. 10(B) described above, in the case of the comparative example, in which the miR-340 mimics were used alone, the amplification level of the miR-340 mimics markedly decreased in all the cases where the miR-340 mimics were treated with the respective reagents (RNase, HCl, and NaOH). On the other hand, as shown in FIG. 15(A), in the example, as a result of allowing the miR-340 mimics and the vesicular fraction derived from lemon to coexist, unlike the comparative example, no marked decrease in the amplification level of the miR-340 mimics was observed in any of the cases where the treatment was performed with the respective reagents, and an amplification level not less than half of that of the control was maintained. Also, as shown in FIG. 15(B), the same holds true for the example in which the vesicular fraction derived from grapefruit was used. From these results, it was found that, due to the addition of the vesicular fraction, the vesicles and the miR-340 mimics form a conjugate, and thus, degradation of the miR-340 mimics by various damaging reagents can be suppressed.

Although the invention of the present application has been described above with reference to the embodiments, the invention is not limited to the above embodiments. Various changes that may be understood by those skilled in the art can be made to the configuration and details of the invention of the present application without departing from the scope of the invention.

This application claims the benefit of priority from Japanese Patent Application No. 2019-126172, filed on Jul. 5, 2019, the entire contents of which are incorporated herein by reference.

INDUSTRIAL APPLICABILITY

For example, the nucleic acid carrier of the present invention can easily hold a nucleic acid, and furthermore, can introduce the thus held nucleic acid into cells. Therefore, it can be said that the present invention is very useful in, for example, the field of medicine such as gene therapy.

The invention claimed is:

1. A method for making a carrier consisting essentially of vesicles from a fruit of a plant in the family Malpighiaceae, wherein the carrier is conjugated to a nucleic acid, comprising:
   a) Obtaining juice from a fruit from a plant in the Malpighiaceae family,
   b) Filtering the juice from step a,
   c) Separating vesicles from the juice of step b,
   d) Ultracentrifuging the vesicles of step c into pellets at 100,000 times gravity and 49,000 rpm for 70 minutes at 4° C.,
   e) Mixing and incubating the vesicle pellets of step d with a nucleic acid in PBS forming a conjugate.

2. The method according to claim 1, wherein the plant in the family Malpighiaceae is an acerola plant species.

3. The method according to claim 1, wherein the vesicles have an average particle size of 30 to 400 nm.

4. The method according to claim 1, wherein the nucleic acid is a nucleic acid reagent for suppressing expression.

* * * * *